United States Patent [19]
Greenfield

[11] Patent Number: 5,440,841
[45] Date of Patent: * Aug. 15, 1995

[54] PEDESTAL MODULE FOR RAISED FLOOR AND RAISED FLOOR

[75] Inventor: Sherwood S. Greenfield, Charlotte, N.C.

[73] Assignee: Powerflor, Inc., Charlotte, N.C.

[*] Notice: The portion of the term of this patent subsequent to Feb. 28, 2012 has been disclaimed.

[21] Appl. No.: 253,367

[22] Filed: Jun. 3, 1994

Related U.S. Application Data

[63] Continuation of Ser. No. 161,977, Dec. 3, 1993, Pat. No. 5,392,571, which is a continuation of Ser. No. 862,519, Apr. 2, 1992, abandoned.

[51] Int. Cl.$^6$ ................................................ E04B 5/00
[52] U.S. Cl. ........................... 52/126.2; 52/126.6; 52/267; 52/220.1
[58] Field of Search .............. 52/105, 126.2, 126.6, 52/222, 220, 267; 174/48, 49

[56] References Cited

U.S. PATENT DOCUMENTS

| | | | |
|---|---|---|---|
| 3,924,370 | 12/1975 | Cauceglia | 52/263 X |
| 4,289,921 | 9/1981 | Gartner | 174/48 |
| 4,297,524 | 10/1981 | Fork | 174/48 |
| 4,443,654 | 4/1984 | Flachbarth | 174/48 |
| 4,536,612 | 8/1985 | Domigan | 174/48 |
| 4,591,656 | 5/1986 | Mohr | 174/48 |
| 4,593,507 | 6/1986 | Hartman | 174/48 X |
| 4,638,115 | 1/1987 | Benscoter | 174/48 |
| 4,676,036 | 6/1987 | Bessert | 52/126.6 |
| 4,780,571 | 10/1988 | Huang | 52/126.6 X |
| 4,905,437 | 3/1990 | Heather | 52/263 |
| 4,914,881 | 4/1990 | Spork | 52/263 |
| 4,922,673 | 5/1990 | Ishii | 52/221 |
| 5,010,211 | 4/1991 | Bartee | 174/48 |
| 5,072,557 | 12/1991 | Naka | 52/126.6 |
| 5,074,085 | 12/1991 | Ueda | 52/126.6 |
| 5,090,169 | 2/1992 | Takeda | 52/582 X |

OTHER PUBLICATIONS

Photocopy of Toli Flex Tile Brochure, undated, 10 pages.

*Primary Examiner*—Carl D. Friedman
*Assistant Examiner*—Beth A. Aubrey
*Attorney, Agent, or Firm*—W. Thad Adams, III

[57] ABSTRACT

A floor pedestal module for being assembled together with a multiplicity of other like modules to form a raised floor providing space beneath the module for electrical and/or communications wiring. The module includes a base having an upper surface and opposed lower surface and four integrally-formed supporting legs formed of a high density, heavy duty plastic material. The lower surface of the module defines a pilot hole integrally-formed in the base for accepting a drill bit. At least two spaced-apart reenforcing ribs are formed in the base concentric with the pilot hole and define therebetween a circular area for being cut out to form an enlarged access hole. The utility receptacle module includes an enlarged flange for being supported by the upper surface of the pedestal module surrounding the access hole. A utility access port is provided in the module for receiving and supporting the electrical or communications utility receptacle.

10 Claims, 9 Drawing Sheets

PEDESTAL MODULE FOR RAISED FLOOR AND RAISED FLOOR

This application is a continuation application U.S. Ser. No. 08/161,977, filed Dec. 3, 1993, U.S. Pat. No. 5,392,571, which is a continuation of U.S. Ser. No. 07/862,519, filed Apr. 2, 1992, abandoned.

TECHNICAL FILED AND BACKGROUND OF THE INVENTION

This invention relates to a pedestal module designed to permit quick and efficient assembly of a raised floor. Raised floors are often constructed over an existing floor (referred to in this application as a "subfloor"). The raised floor defines a space below which electrical and communications wiring can be accommodated. This avoids costly rewiring of existing conduit buried within the existing subfloor.

Existing raised floor systems solve these problems but create their own problems, such as where and how to locate utility receptacles, how to attach the receptacles to the floor, and how to rearrange the positioning of the receptacles if the work space configuration on the floor is changed. Raised floors can also be difficult to construct, since they are not typically permanently attached the subfloor and can shift during installation. The invention disclosed in this application solves these problems. The raised floor permits electrical and communications utility wiring, alarm systems, heating and cooling management wiring and similar wiring to be quickly and easily installed between the raised floor and the existing, supporting subfloor. The raised floor also permits quick rearrangement of the utility outlets positioned in selected ones of the pedestal modules which may be necessary when rearranging the configuration of the work space on the raised floor.

SUMMARY OF THE INVENTION

Therefore, it is an object of the invention to provide a raised floor.

It is another object of the invention to provide a raised floor which is quick and easy to install, and to move to another location.

It is another object of the invention to provide a raised floor which will accommodate both electrical and communications receptacles.

It is another object of the invention to provide a raised floor which permits the pedestal modules from which the floor is assembled to be rearranged when necessary.

It is another object of the invention to provide a raised floor which accommodates irregularities in the subfloor.

It is another object of the invention to provide a pedestal module for a raised floor through which a hole can be cut to provide a utility access hole.

It is another object of the invention to provide a pedestal module for a raised floor which includes a utility receptacle module for supporting either an electrical or communications receptacle.

It is another object of the invention to provide a lock for precisely positioning the pedestal modules to the subfloor during and after construction.

These and other objects of the present invention are achieved in the preferred embodiments disclosed below by providing a floor pedestal module for being assembled together with a multiplicity of other like modules to form a raised floor providing space beneath the module for electrical and/or communications wiring. The module comprises a base having an upper surface and opposed lower surface and four integrally-formed supporting legs formed of a high density, heavy duty plastic material. The lower surface of the module defines a pilot hole integrally-formed in the base for accepting a drill bit. At least two spaced-apart reenforcing ribs are formed in the base concentric with the pilot hole and define therebetween a circular area for being cut out to form an enlarged access hole.

According to one preferred embodiment of the invention, a utility receptacle module is provided for being positioned in the access hole and receiving an electrical or communications utility receptacle for being accessed through an access port therein.

According to another preferred embodiment of the invention, the utility receptacle module includes an enlarged flange for being supported by the upper surface of the pedestal module surrounding the access hole.

According to yet another preferred embodiment of the invention, a utility access port is provided in the module for receiving and supporting the electrical or communications utility receptacle.

According to one preferred embodiment of the invention, a cover is provided for being positioned in the utility receptacle module access port.

Preferably, clip means interconnect with the utility receptacle module for supporting an electrical receptacle therein.

According to one preferred embodiment of the invention, an enlarged flange is provided which includes spacing means for spacing the flange above the upper surface of the pedestal module a distance sufficient to accommodate carpeting between the upper surface of the pedestal module and the flange.

According to another preferred embodiment of the invention, a raised floor for accommodating electrical and/or communications wiring between the raised floor and a subfloor on which the raised is supported is provided, the raised floor comprising a multiplicity of floor pedestal modules as described above and as claimed.

According to one preferred embodiment of the invention, a pedestal module lock is provided for locking four adjacent pedestal modules together against shifting during installation of the floor and during use of the floor.

Preferably, the pedestal module lock includes attachment means for fixedly attaching the pedestal module lock to a predetermined, fixed position on the subfloor, and four symmetrically arranged, integrally-formed leg-receiving apertures for receiving a respective one of the legs of the four adjacent pedestal modules.

BRIEF DESCRIPTION THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
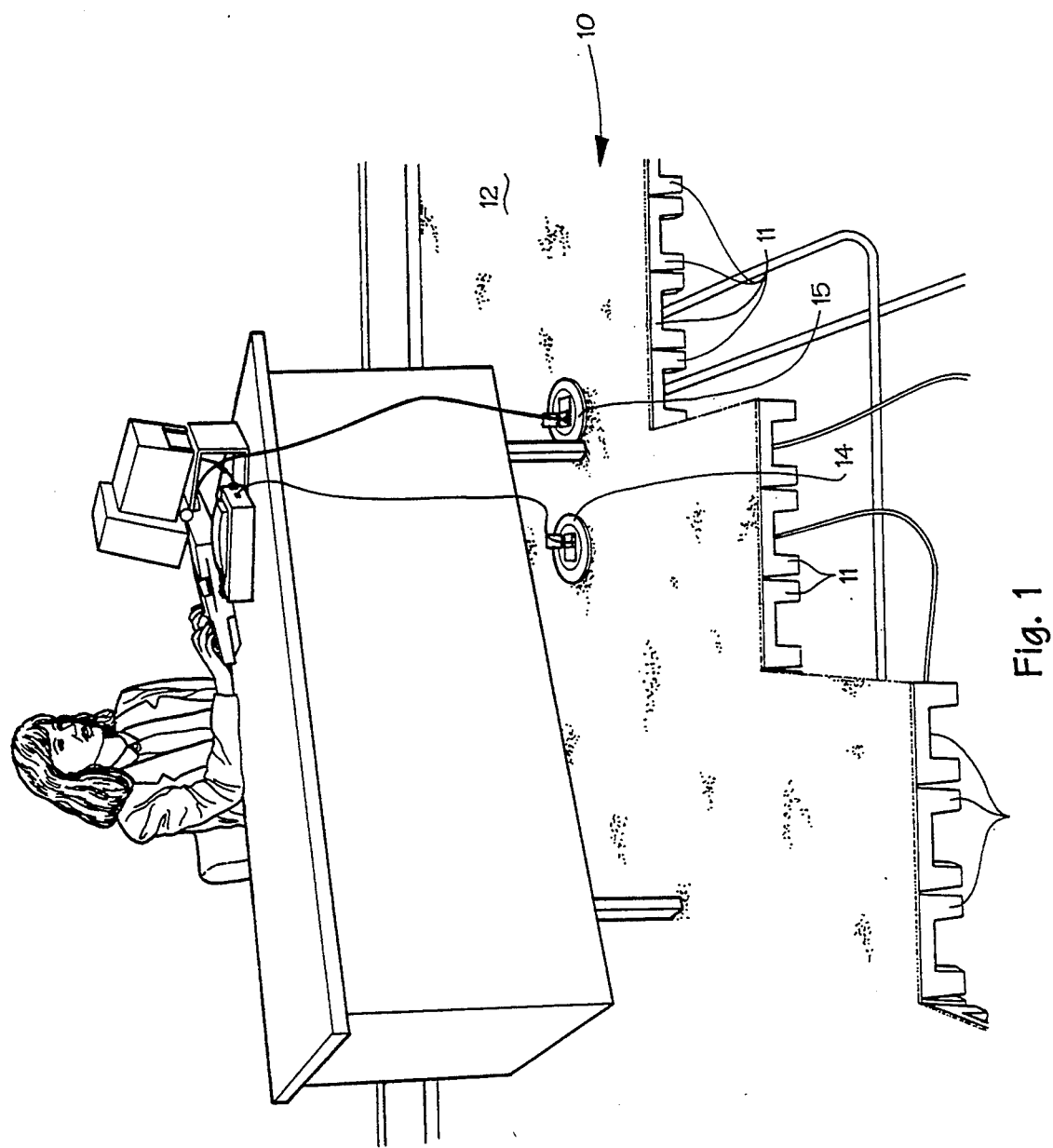
FIG. 1 is an environmental view of a raised floor according to an embodiment of the present invention.

Referring now specifically to the drawings, a raised floor according to the present invention is illustrated in FIG. 1 and shown generally at reference numeral 10. Raised floor 10 is formed of a multiplicity of pedestal modules 11 which are laid adjacent each other to form a flat, raised surface, and then covered with floor covering such as carpeting 12 which is adhered to the top surface of the pedestal modules 11 to hold the pedestal modules together. The pedestal modules 11 are not fastened or adhered to the floor and thus are not leasehold items. For this reason, the floor can be removed and taken by the tenant/owner when vacating premises.

As is shown by continued reference to FIG. 1, the pedestal modules 11 define access areas which extend the length and breadth of the area covered by the floor 10, and which permit the passage of electrical and/or communications wiring as needed from utility connections to locations in the floor where receptacle outlets are needed. FIG. 1 illustrates a communication receptacle outlet 14 and an electrical receptacle outlet 15 located in the raised floor 10 in proximity to a desk.

Figure 2:
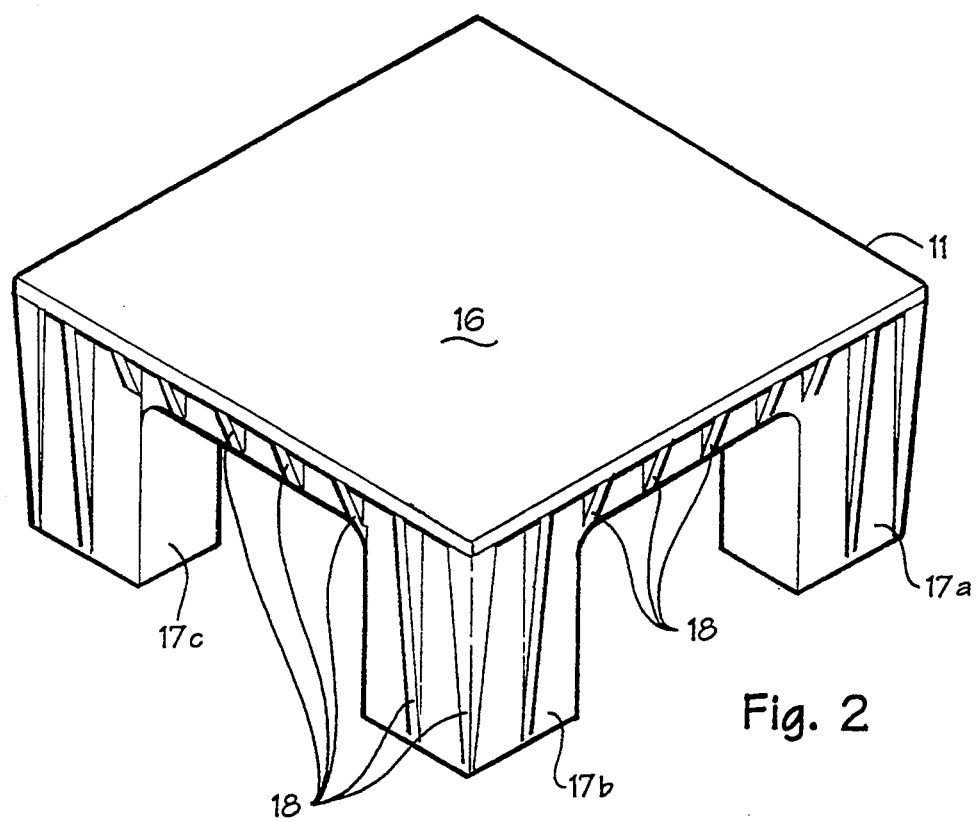
FIG. 2 is a perspective view of the top of one of the pedestal modules.
Figure 3:
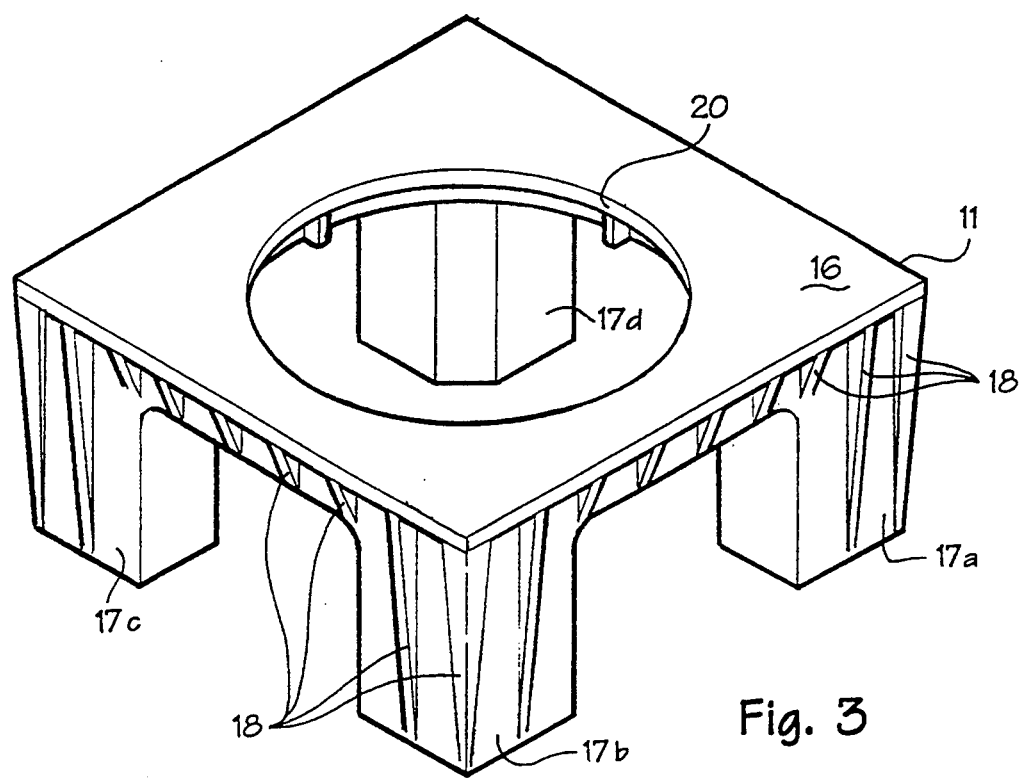
FIG. 3 is a perspective view of the pedestal module of FIG. 2, with a hole cut for installing an electrical or communications receptacle.

A pedestal module 11 as shown installed in FIG. 1 is shown in FIGS. 2 and 3. Each pedestal module 11 is molded of a low weight, high strength polymer thermoplastic, such as PBT resin sold under the trademark "Valox". As molded, the structure supports a compression load of approximately 2000 pounds per square inch. Each pedestal module 11 is molded to define a base 16 having a relatively flat top surface with four integrally-formed legs 17a–17d. The top surface of base 16 in the preferred embodiment is 6 inches (15.2 cm) square, with the underside of the base slightly smaller. Reenforcing ribs 18 provide additional rigidity and support to the base 16.

The legs 17a–17d themselves are slightly tapered from top to bottom to provide a slight clearance between the ends of legs of adjacent pedestal modules 11. This prevents interference between adjacent legs when slight irregularities in the surface of the subfloor cause adjacent pedestal modules 11 to tilt slightly with respect to each other. This permits such slight tilting to be accommodated without gaps or cracks between the top surfaces of adjacent pedestal modules 11. See FIG. 5. The overall height of the pedestal module 11 is 2⅝ inches (6.7 cm.)

Figure 4:
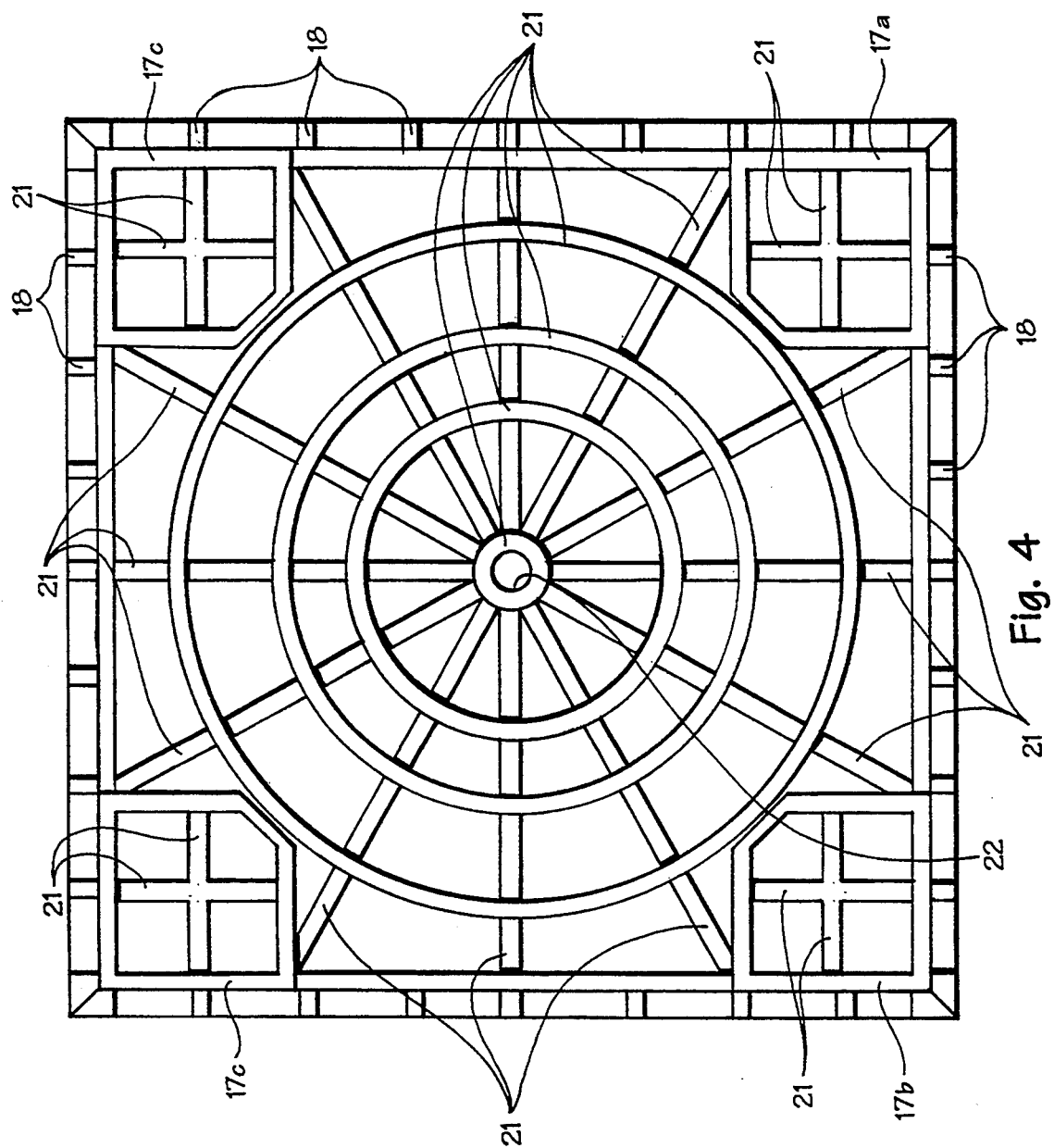
FIG. 4 is a plan view of the under side of the pedestal module of FIG. 2, showing the rib pattern and the pilot hole for drilling the hole shown in FIG. 3.

As is shown in FIG. 3, an access hole 20 defined by the base 16 is formed to permit installation of a receptacle. As is shown in FIG. 4, the underside of the pedestal module 11 comprises a number of intersecting ribs 21 having a deep relief of approximately ⅜ths inch (1 cm), and other ribs having a less deep relief of approximately 3/16th inch (0.5 cm) and a thickness of between approximately 1/16th and ⅛th inches (0.15 cm and 0.3 cm). Note that the interior of the hollow legs 17a–17d are also reenforced with ribs 22.

A pilot hole 22 is defined by the innermost concentric rib 21 and is used to receive and guide a drill bit portion of a hole saw or other hole-forming tool. Using the pilot hole 22, the hole 20 best shown in FIG. 3 is formed by cutting completely through the ribs and the base 11 of the pedestal module 11.

Figure 6:
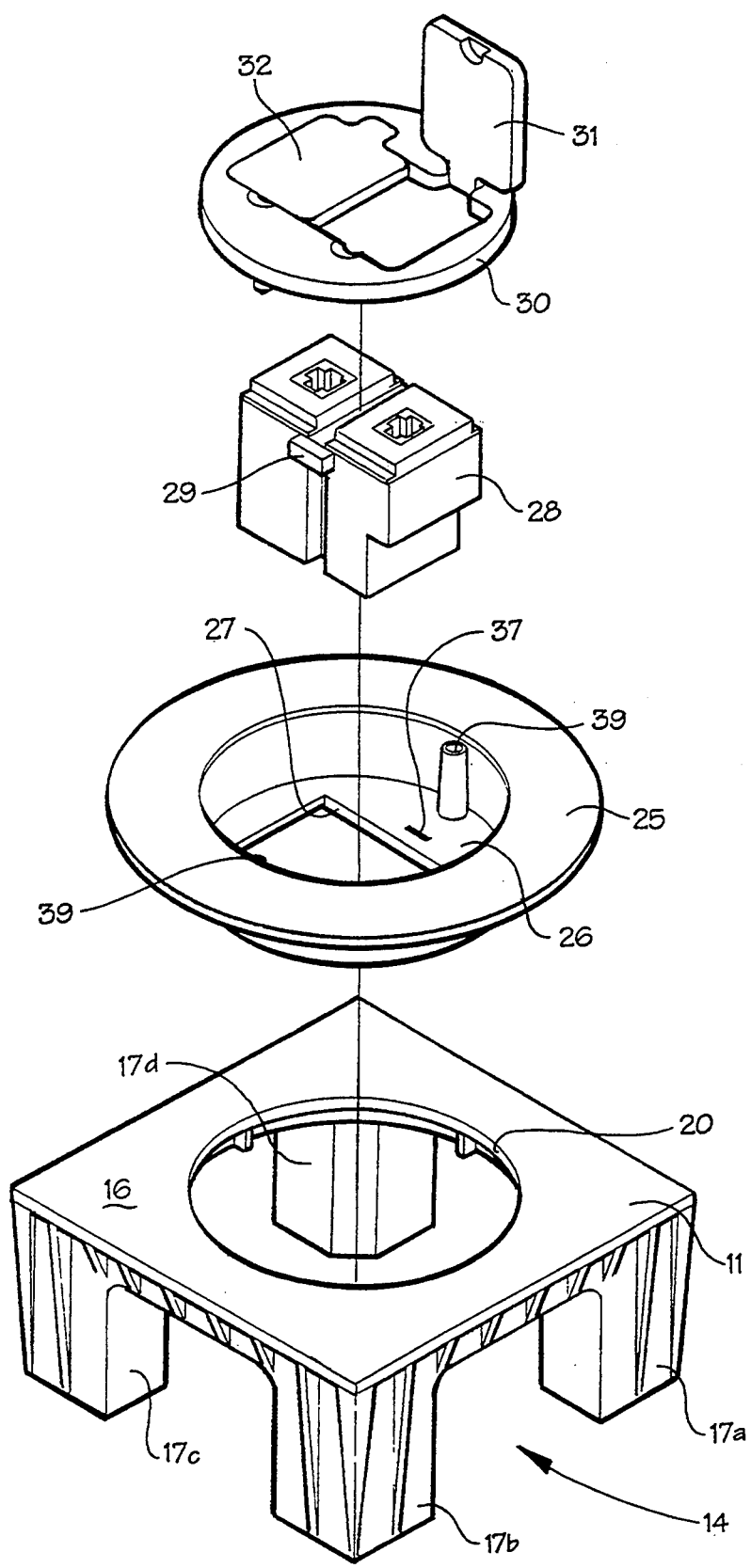
FIG. 6 is an exploded view of a pedestal module adapted for accommodating a communications receptacle therein.
Figure 11:
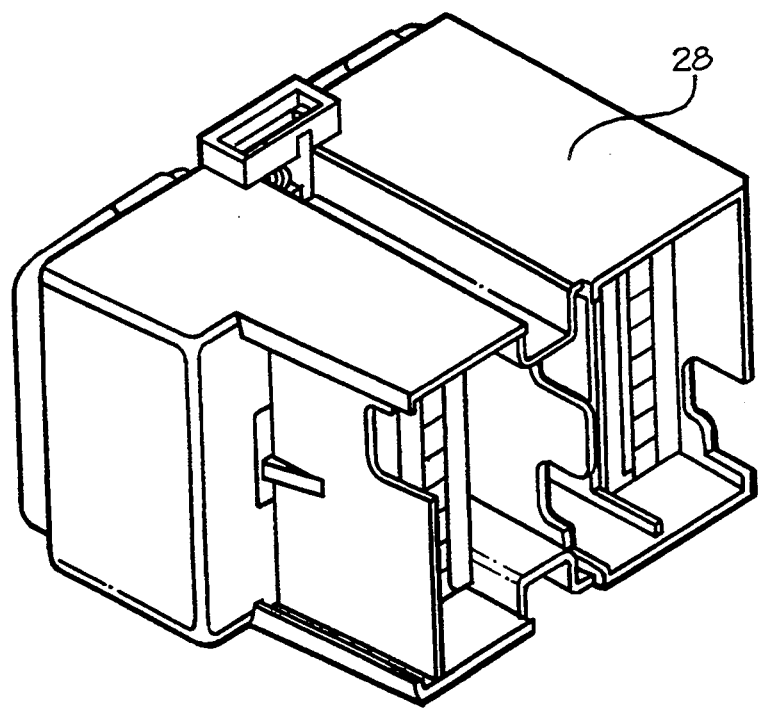
FIG. 11 is a perspective view of a communications receptacle for use with the module, as shown in FIG. 6.

Referring now to FIG. 6, assembly of pedestal module 11 into the receptacle outlet 14 to accommodate a receptacle is illustrated. A flange assembly 25 is positioned in hole 20. A bottom surface 26 of the flange assembly 25 has a utility access port 27 therein which is sized to receive a utility module 28 from the top. The module 28 is a communications receptacle (see also FIG. 11) with two standard telecommunication jacks. The module 28 is held by a press fit, and positioned at the correct height by a stop tab 29 with is supported on the top side of the bottom surface 26 of the flange assembly 25.

Figure 5:
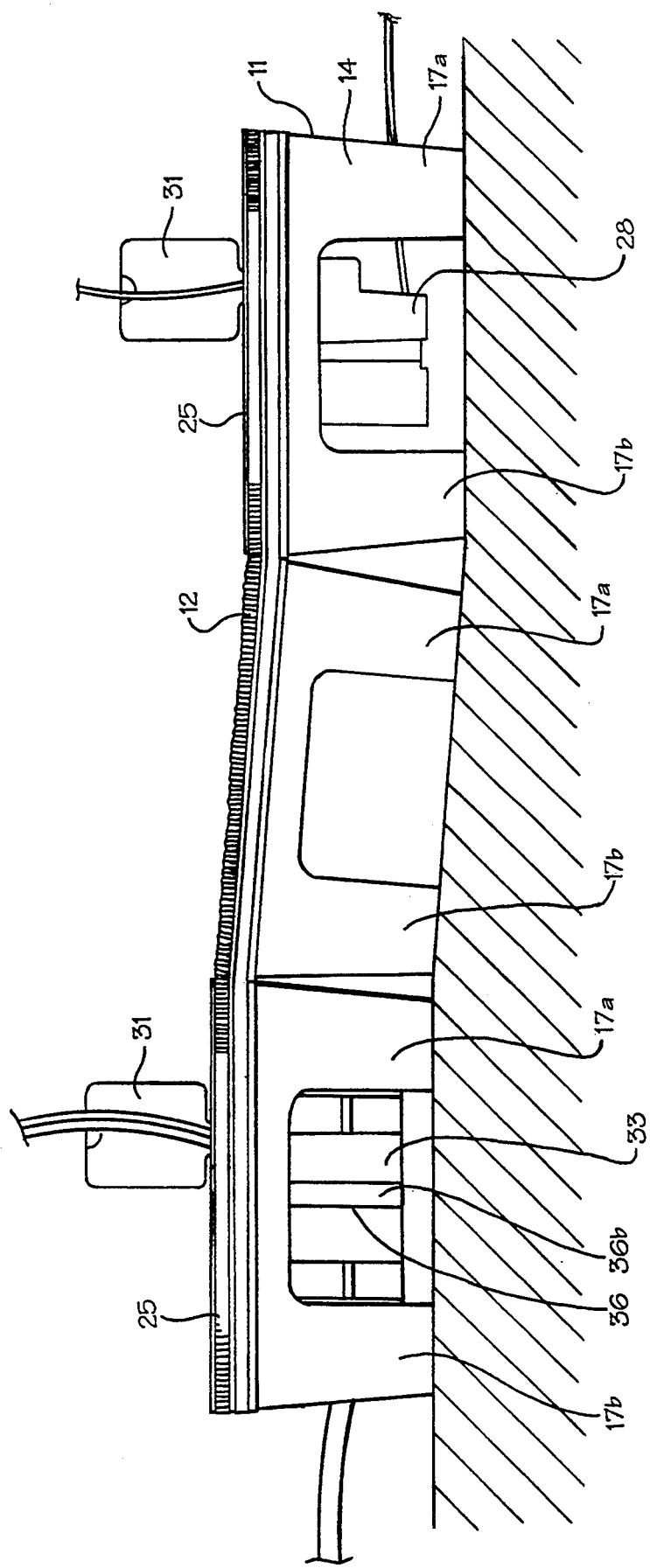
FIG. 5 is a side elevation view of several pedestal modules united together, and illustrating that irregularities in a subfloor can be accommodated.

The flange assembly 26 has sufficient depth to permit carpet to be placed on the top surface of the base 16 between the base 16 and the flange assembly 25. See FIG. 5. An annular cover 30 fits into the top of the flange assembly 25. A pair of short studs 38 are molded onto the underside of the cover 30 and fit into annular apertures 39 molded into opposing sides of the flange assembly 25. The cover includes a pair of receptacle access lids 31, 32 which pivot to alternately cover and expose either or both or neither of the telecommunications jacks. The assembled receptacle outlet 14 as shown in FIG. 6 is also shown in FIG. 5.

Figure 7:
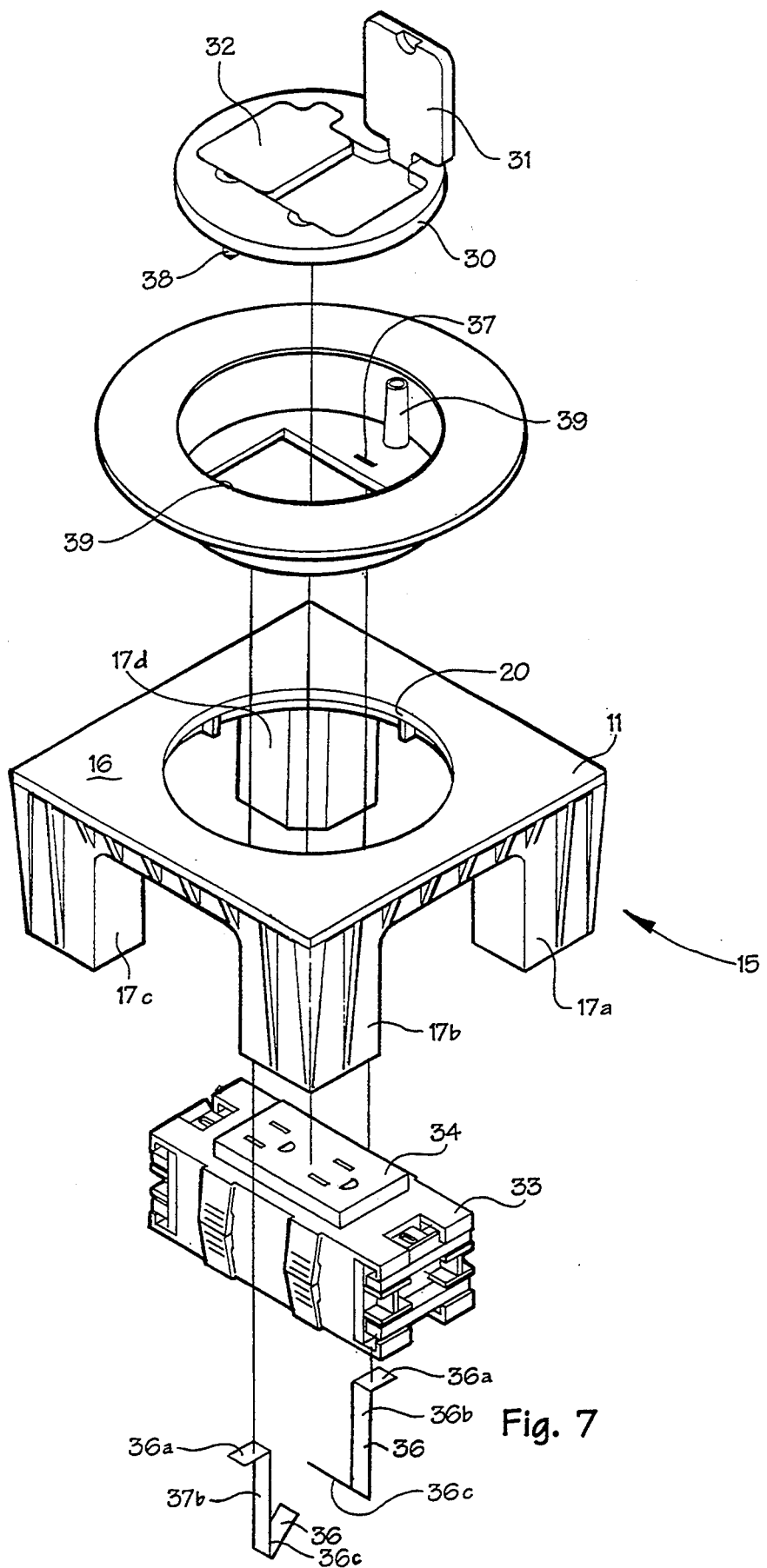
FIG. 7 is an exploded view of a pedestal module adapted for accommodating an electrical receptacle therein.
Figure 12:
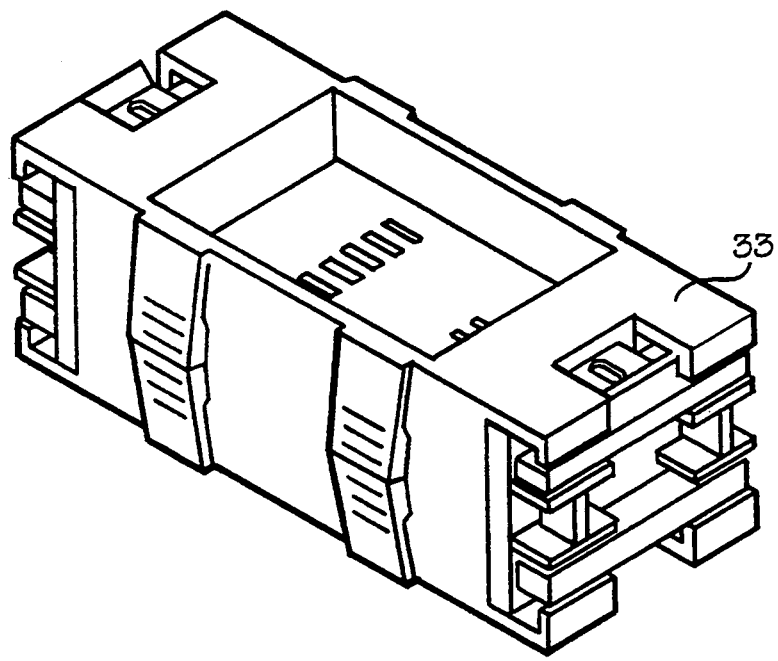
FIG. 12 is a perspective view of an electrical receptacle for use with the pedestal module, as shown in FIG. 7.

Referring now to FIG. 7, assembly of pedestal module 11 into receptacle outlet 15 to accommodate an electrical receptacle is illustrated. The flange assembly 25 is positioned in hole 20. The bottom surface 26 of the flange assembly 25 will not only accommodate the utility module 28 shown in FIG. 6, but instead an electrical receptacle module 33 through the bottom. The module 33 is an electrical receptacle with two standard three-prong electrical jacks. See also FIG. 12. The module 33 is fitted into the access port 27 from the bottom. The raised area 34 of module 33 fits above the level of the top side of the bottom surface of the flange 26.

Electrical outlet module 33 is held in place by a pair of Z-shaped spring steel clips 36. Clips 36 are positioned in respective slots 37 by their respective top portions 36a. Slots 37 are positioned on opposite sides of the access port 27 (one shown in FIG. 6). The bottom portions 36c of the slots 37 are snapped under the bottom surface of the electrical outlet module 33 to hold it in place.

The flange assembly 26 has sufficient depth to permit carpet to be placed on the top surface of the base 16 between the base 16 and the flange assembly 25. See FIG. 5. The annular cover 30 fits into the top of the flange assembly 25, as described above, and includes a pair of receptacle access lids 31, 32 which pivot to alternately cover and expose either or both or neither of the electrical jacks. The assembled receptacle outlet 15 as shown in FIG. 6 is also shown in FIG. 5.

Figure 8:
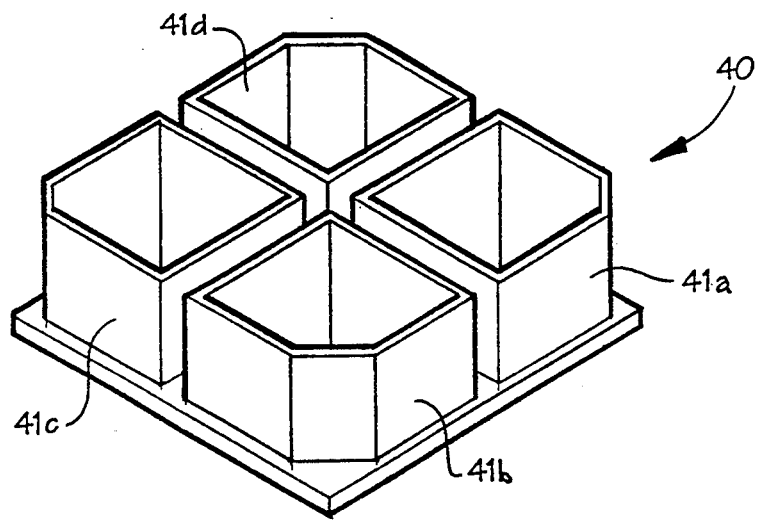
FIG. 8 is a perspective view of a pedestal module lock according to an embodiment of the invention.

Referring now to FIG. 8, a pedestal module lock 40 is illustrated. Pedestal module lock 40 is used to firmly and securely position four adjacent pedestal modules 11 during installation of the raised floor 10. Since the pedestal modules 11 are positioned on the floor without being fastened, shifting is possible during installation, particularly if they are tapped to move them into place.

Figure 9:
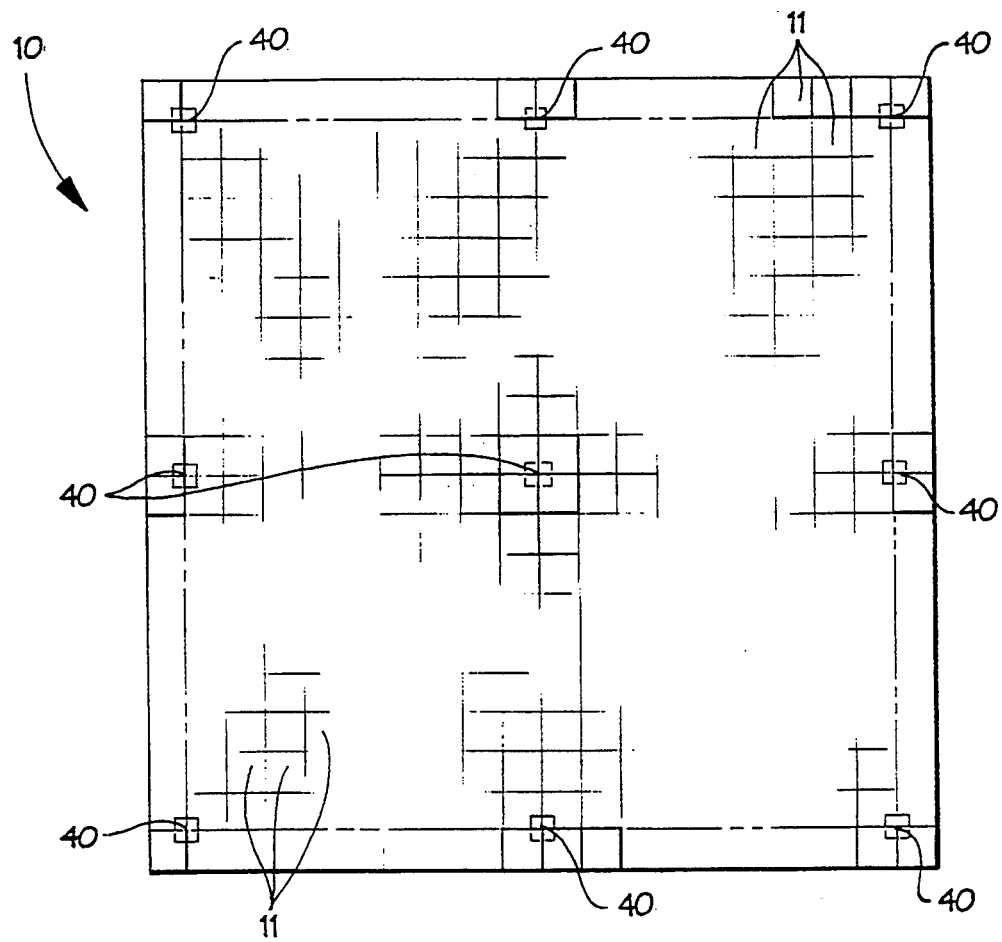
FIG. 9 is a top plan view showing the placement of pedestal module locks during installation of the raised floor.

Pedestal module lock 40 is molded of the same material as the pedestal module 11, and has four hollow integrally-formed leg-receiving apertures 41a–41d. Attachment means in the form of a hole (not shown) in the space between the legs 41a–d in the middle of the lock 40 is provided for attaching the pedestal module lock 40 to the subfloor. Pedestal module lock 40 is nailed or bolted to the subfloor after the proper position has been carefully measured. One lock 40 is desirable for about every 500 square feet (48 sq.m.) but can be used in any suitable arrangement. As is shown in FIG. 9, the locks 40 are spaced around the area to be floored.

Figure 10:
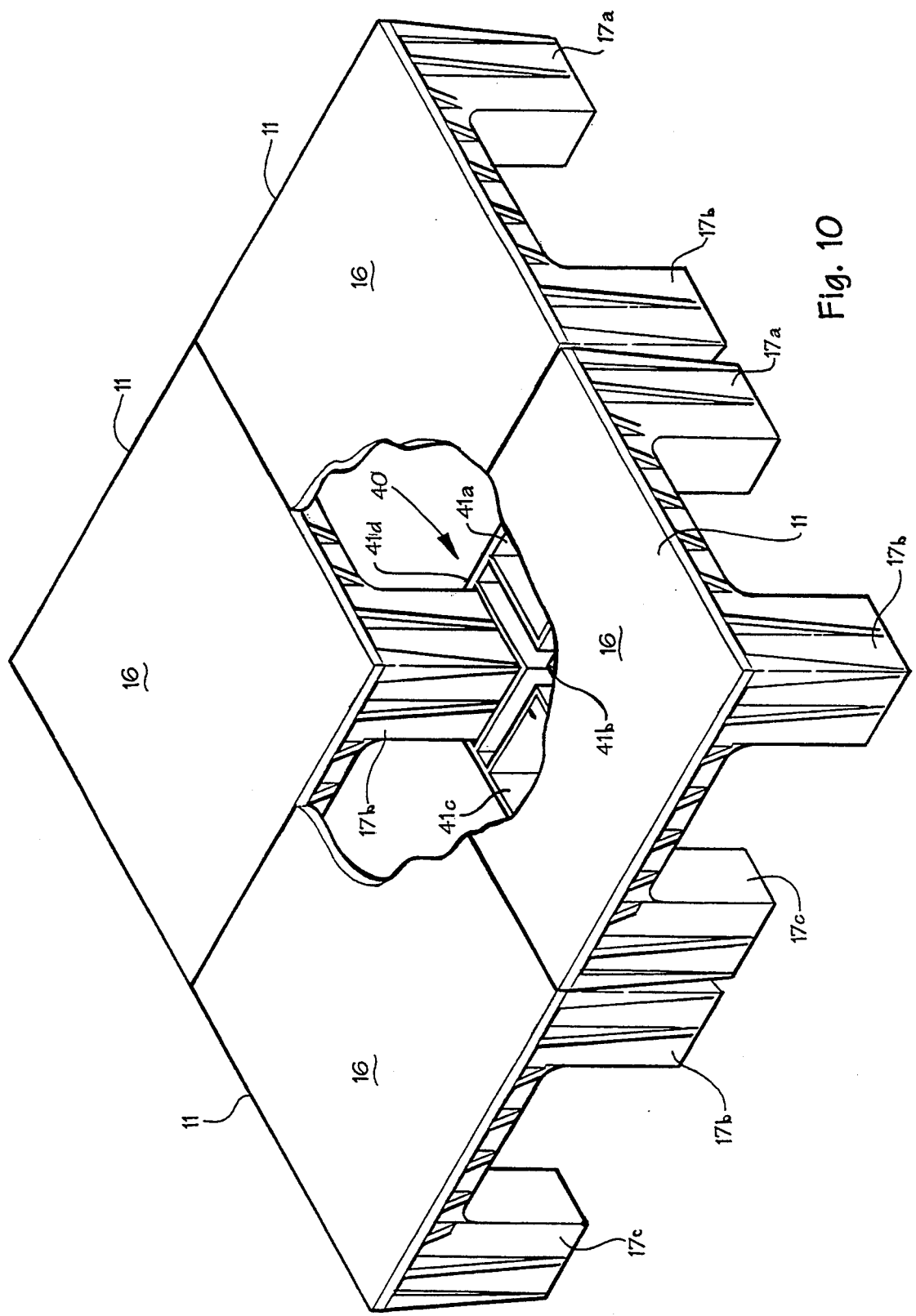
FIG. 10 is a perspective view, with parts broken away, of the pedestal module lock connecting four adjacent pedestal modules together.

As is shown in FIG. 10, four adjacent pedestal modules 11 are positioned next to each other with one leg of each of the pedestal modules 11 in a respective one of the hollow legs 41a–41d. Since the lock 40 is itself fastened to the subfloor, these four pedestal modules 11 are also locked into position. These four pedestal modules 11 form a stationary foundation against which the remainder of the pedestal modules 11 can be positioned as the raised floor 10 is built. This prevents shifting of the floor and provides a secure base for the assembly of the remainder floor.

The assembled raised floor 10 can be rearranged as needed to accommodate changes in the configuration of the workspace on the floor. If desks are moved, the receptacle outlets 14 and/or 15 can be easily removed and repositioned. The previous locations of the receptacle outlets 14 and/or 15 are filled with ordinary pedestal modules 11. The areas beneath the pedestal modules 11 permit easy repositioning of the wiring as necessary to travel to the new position of the receptacle outlets 14 and/or 15.

A pedestal module and raised floor is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. In combination with a pedestal module of a raised floor assembly mounted on a supporting subfloor, the pedestal module including a base for being vertically spaced apart from the supporting subfloor by a plurality of legs, the base having an access hole defined therein for receiving an electrical or communications utility receptable, the improvement comprising:

(a) a flange assembly for being positioned in the access hole of the base, and defining a recessed compartment, said recessed compartment including a bottom surface thereof defining a utility access port therein for receiving and storing the utility receptacle; and (b) a cover including a pivotable, receptacle access lid for being positioned in the utility access port of the flange assembly for covering the utility receptacle or for exposing the utility receptacle for access thereto.

2. An improved pedestal module according to claim 1, wherein said flange assembly includes an annular, enlarged flange formed thereto for engaging an upper surface of the base of the pedestal module to support the flange assembly within the access hole.

3. An improved pedestal module according to claim 2, wherein said enlarged flange includes spacing means for spacing the flange above the upper surface of the base of the pedestal module a sufficient distance to accommodate carpeting between the upper surface of the base and the flange.

4. An improved pedestal module according to claim 1, wherein an underside of said cover includes a connecting stud molded thereto for being mated with a complementary aperture formed in said flange assembly to connect said cover and said flange assembly together.

5. An improved pedestal module according to claim 1, wherein the bottom surface of the recessed compartment includes a slot therein for receiving a respective one of said at least one clips to hold said clip to said flange assembly.

6. An improved pedestal module according to claim 1, further comprising at least one clip for interconnecting the utility receptacle and the flange assembly to hold the utility receptacle within the space defined between the base of the pedestal module and the supporting subfloor.

7. An improved pedestal module according to claim 6, wherein said at least one clip comprises:

(a) a top portion connected to the flange assembly, and extending parallel to the plane of the supporting surface for engaging a bottom surface of the flange assembly;

(b) a bottom portion for being located beneath the top portion within the space defined between the base and the supporting subfloor, said bottom portion including means for releasably engaging a portion of the receptacle to hold the receptacle within the space defined between the base and the supporting subfloor; and (c) a central portion interposed between the top and bottom portions for interconnecting the top and bottom portions.

8. An improved pedestal module according to claim 7, wherein the bottom portion of said clip extends at an acute angle relative to the central portion in a direction opposite the direction of the top portion, whereby the receptacle is held within the space defined between the base and the supporting subfloor by engagement thereof with the bottom and central portions of the clip, and is released from said clip by flexing the bottom portion of the clip outwardly away from the receptacle to disengage the clip from the receptacle.

9. An improved pedestal module according to claim 7, wherein said at least one clip comprises a thin, flat strip of spring steel having first and second bends formed therein, the first bend defining the top portion thereof and the second bend defining the bottom portion thereof.

10. An improved pedestal module according to claim 6, wherein said at least one clip is z-shaped.

* * * * *